Feb. 9, 1937.                F. G. BEETEM                2,069,737
        MEANS FOR CONTROLLING THE CHARGING VOLTAGE OF STORAGE BATTERIES
                            Filed June 25, 1936

WITNESS:
Rob+ R Mitchell

INVENTOR
Frank G Beetem
BY
Augustus B. Stoughton
    ATTORNEY.

Patented Feb. 9, 1937

2,069,737

UNITED STATES PATENT OFFICE 2,069,737

MEANS FOR CONTROLLING THE CHARGING VOLTAGE OF STORAGE BATTERIES

Frank G. Beetem, Philadelphia, Pa., assignor to The Electric Storage Battery Company, Philadelphia, Pa., a corporation of New Jersey Application June 25, 1936, Serial No. 87,136

4 Claims. (Cl. 171—314)

The invention relates more particularly to a system in which a storage battery is connected across a direct current generator and one object of the invention is to maintain the voltage applied to the terminals of the battery at a constant value suitable for keeping the battery in a fully charged condition without excessive overcharge.

It is recognized that, even when not subjected to any discharge, a battery requires to be supplied with a small trickle charge current in order to compensate for local action and to maintain the battery in a fully charged condition. The current required for this purpose varies appreciably with changes of temperature of the battery, but it is found that, by maintaining the voltage at the battery terminals substantially constant at some predetermined voltage of suitable value, the proper trickle charge will be supplied over a comparatively wide variation of temperature.

When a battery is charged from a direct current generator, it is sometimes difficult to maintain the voltage across the battery terminals at a constant value without frequent manual adjustment. This invention provides automatic means for maintaining constant voltage at the battery terminals and for this purpose a rectifier of the gas filled triode type is employed, the grid bias being controlled in response to very minute changes of voltage across the battery to counteract such changes. This rectifier is connected to the field circuit of the generator.

Figure 1:
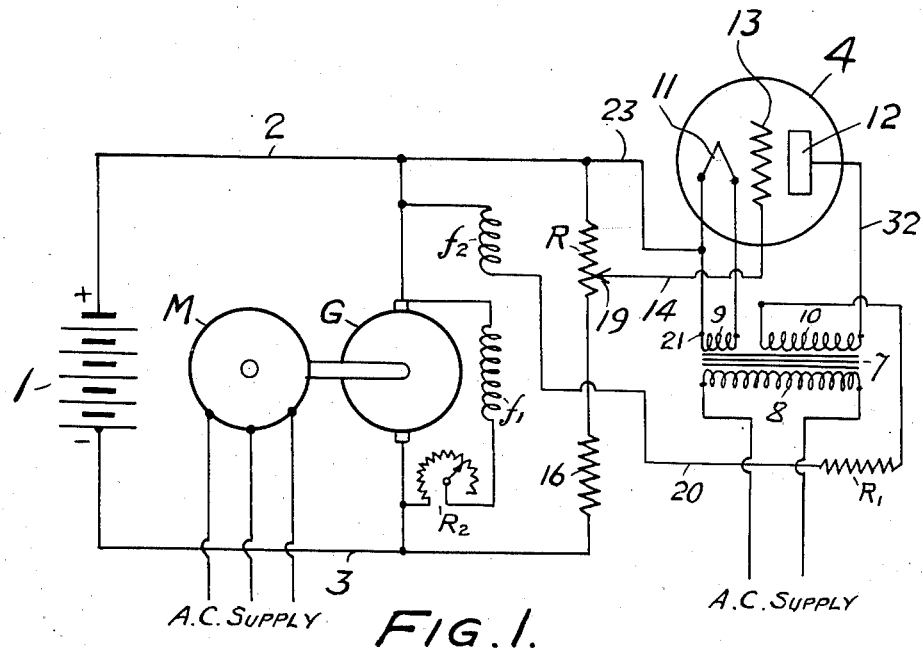
Figure 1 shows a control circuit connected to an auxiliary field winding on the generator.

Referring to Figure 1, there is shown a battery 1 connected across the circuit 2, 3 across which circuit is also connected the direct current generator G having a main shunt field $f_1$ connected across the generator terminals through a field rheostat $R_2$ in the usual manner. An auxiliary field $f_2$ is shown, to which current is supplied from an A. C. source through the transformer 7 and the rectifier 4, this latter being of the gaseous triode type. The transformer 7 is provided with a primary winding 8 connected to the A. C. circuit and with two secondary windings 9 and 10, of which winding 9 is connected to supply heating current to the cathode 11 and winding 10 is connected at one terminal to plate 12 of the rectifier, and at the other terminal via conductor 20, resistor $R_1$, and auxiliary field $f_2$ to conductor 2. Terminal 21 of winding 9 which is most negative during the half cycle when current flows from the plate 12 to the filament 11 is connected by conductor 23 to conductor 2 and thereby to the positive terminal of the battery. The grid 13 of the rectifier is connected by conductor 14 to an intermediate point in the resistor R, which resistor is connected across the circuit 2, 3. In series with the resistor is connected a resistor 16 having special characteristics. One of these characteristics is an inverse current-resistance characteristic whereby the resistance decreases with increase of current passing through the resistor. Another characteristic is an inverse temperature-resistance characteristic whereby the resistance decreases with increase of temperature. These two characteristics are exhibited by the resistance material Thyrite which is now on the market and is described in U. S. Patent No. 1,822,742, to Karl B. Eachron.

The characteristic of the gas filled triode 4 is such that the flow of current from the plate 12 to the cathode 11 is controlled by the negative bias of the grid 13. Under given conditions of filament temperature and plate voltage, the flow of current will be prevented by a certain negative bias on the grid 13, but, upon a small reduction in this negative bias, current will flow in the direction to excite field winding $f_2$ to charge the battery 1 during each half-cycle. The adjustment of the apparatus and circuits may be such that, when the voltage across the circuit 2, 3 is at the desired point to maintain the battery in a fully charged condition, the bias applied to the grid 13 will be suitable for delivering the necessary mean current to field winding $f_2$ to maintain this voltage at the battery terminals. If for any reason the voltage of the battery should increase slightly, the voltage drop between conductor 2 and the sliding contact 19 will increase, thus increasing the negative bias applied to the grid 13. If this increase is sufficient, the current through $f_2$ will be interrupted until the voltage across the circuit 2, 3 has fallen to the original value, when the bias applied to the grid 13 will be reduced and the flow of current will be re-established. Thus the output of the rectifier will consist of a series of half-wave impulses maintained for certain periods of time separated by periods of complete interruption of current output and the mean value of current through $f_2$ will be determined by the relative length of the two periods, which, in turn, will depend upon the grid bias as controlled by the battery voltage as described above.

The characteristic of the resistor 16 increases the sensitiveness of the control since any increase in current through the resistor 16 will lower its resistance, causing more current to flow through resistor R and therefore more voltage drop between conductor 2 and contact 19 than would have resulted if the resistance of resistor 16 were constant. It will be seen therefore that, by reason of the characteristic of resistor 16, less increase of voltage will be required across the circuit 2, 3 to interrupt the charging current, and the voltage across the battery 1 will be maintained more nearly constant.

It is a characteristic of some gas-filled triode rectifiers that their critical grid control voltage changes with the change of ambient temperature, this control voltage becoming more negative the higher the temperature, which is undesirable in the application herein described. The temperature characteristic of the resistor 16, whereby its resistance decreases with increase of ambient temperature, will tend to counteract this effect since an increase in temperature and a corresponding decrease in the resistance of resistor 16 will permit more current to flow through resistor R, thereby increasing the drop between conductor 2 and contact 19. This produces an increase in the negative bias applied to grid 13, tending to reduce the mean flow of current, thus counteracting the effect of increased ambient temperature on the control of the rectifier.

In the diagram the generator G is shown driven by an A. C. motor M but any suitable means for driving the generator may be furnished.

Figure 2:
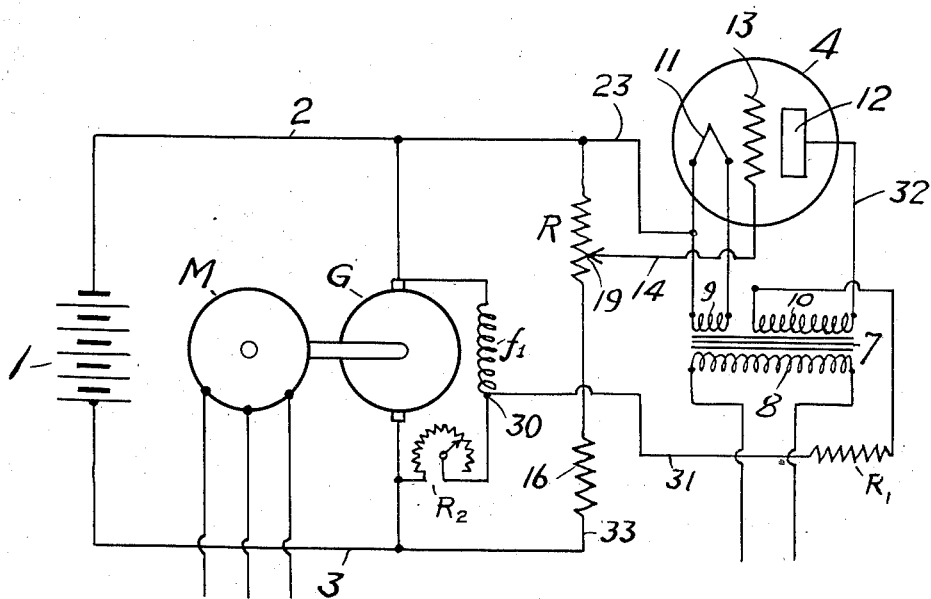
Figure 2 shows the control circuit connected across the field of the main rheostat.

Figure 2 shows a modification of the system shown in Figure 1, in which the gas filled rectifier 4 is connected through secondary winding 10 across the terminals of the field rheostat $R_2$ instead of across the auxiliary field winding $f_2$ of Figure 1. This circuit may be traced from the point 30 between the rheostat $R_2$ and the field winding $f_1$ via conductor 31, resistor $R_1$, winding 10, conductor 32, plate 12 to filament 11, thence via conductor 23, resistor R, resistor 16, conductor 33 to the opposite terminal of rheostat $R_2$. During the half cycle when current flows through the rectifier, the total current in the rheostat $R_2$ will be reduced, thus reducing the drop in the rheostat and increasing the current in the field $f_1$. In other words, at the junction point 30, the current in the circuit of the thermionic tube 4 will divide, a part passing through the rheostat $R_2$ and a part through field winding $f_1$, these currents combining algebraically with the currents previously flowing in those circuits. That portion of the rectifier current which passes through rheostat $R_2$ will be in the opposite direction to that previously flowing and will reduce the total current, as described. That part flowing through field winding $f_1$ will be in the same direction as that previously flowing, so that the total current will be increased. This will have the same effect as that described in connection with Figure 1, namely a small decrease in voltage across the circuit 2, 3 will decrease the drop in resistor R between conductor 2 and sliding contact 19, which will decrease the negative bias applied to grid 13, causing a flow of current through the rectifier which will have the effect of increasing the excitation in field $f_1$ as mentioned above, thus counteracting the drop of voltage across the circuit 2, 3.

I claim:

1. In combination a storage battery, a charging means therefor including a direct current generator having a field winding circuit, a source of alternating current, a gas-filled thermionic rectifier provided with filament, grid and plate electrodes, connections for applying A. C. potentials to the filament and plate electrodes, a circuit connected across the battery including in series a fixed resistor and a resistor having an inverse current resistance characteristic, a connection to the positive terminal of the battery from that terminal of the filament which is most negative when the plate potential is positive, a connection from the grid to an intermediate point in the resistance circuit, and means for transmitting the plate current to the field winding circuit.

2. In apparatus for maintaining substantially constant voltage across the terminals of a storage battery, the combination of a source of alternating current, a thermionic rectifier of the gas filled type having filament, grid and plate electrodes, means including circuit connections for supplying current from the A. C. source to the filament and plate circuits, a resistance circuit connected across the battery, a connection to the positive terminal of the battery from that terminal of the filament which is most negative when the plate potential is positive, a connection from the grid to an intermediate point in the resistance circuit, a direct current generator connected to the battery and plate circuit connections for controlling the field of the generator.

3. In a storage battery charging system means, including a source of alternating current, for maintaining a substantially constant voltage across the battery terminals substantially independent of the A. C. voltage comprising a rectifier of the gas filled triode type connected to said A. C. circuit, means for applying the pulsating output of the plate circuit for controlling the battery voltage, and means substantially independent of the A. C. voltage and responsive to minute changes of voltage across the battery for controlling the grid bias of the rectifier to counteract such changes.

4. In a storage battery charging system means, including a source of alternating current, for maintaining a substantially constant voltage across the battery terminals substantially independent of the A. C. voltage comprising a rectifier of the gas filled triode type having filament, grid and plate electrodes connected to said A. C. circuit, means for applying the pulsating output of the plate circuit for controlling the battery voltage, and means responsive to minute changes of voltage across the battery for controlling the grid bias of the rectifier to counteract such changes, said means including a resistance circuit connected across the battery, a connection to the positive terminal of the battery from that terminal of the filament which is most negative when the plate potential is positive, and a connection from the grid to an intermediate point in the resistance circuit.

FRANK G. BEETEM.